United States Patent [19]

Zipperle et al.

[11] Patent Number: 5,678,875
[45] Date of Patent: Oct. 21, 1997

[54] RECEIVING ARRANGEMENT FOR EQUIPMENT AND/OR OBJECTS IN A MOTOR VEHICLE PASSENGER COMPARTMENT

[75] Inventors: Ralf Zipperle, Ottenbronn; Jürgen Körber, Sindelfingen, both of Germany

[73] Assignee: Mercedes-Benz AG, Germany

[21] Appl. No.: 659,894

[22] Filed: Jun. 7, 1996

[30] Foreign Application Priority Data

Jun. 14, 1995 [DE] Germany .................... 195 21 592.3

[51] Int. Cl.⁶ .................................................. B60R 7/06
[52] U.S. Cl. ................... 296/37.8; 224/281; 224/483; 224/542; 296/37.12
[58] Field of Search ......................... 296/37.7, 37.12, 296/37.8, 37.9; 224/483, 281, 544, 542

[56] References Cited

FOREIGN PATENT DOCUMENTS

| 2833823 | 2/1980 | Germany | 224/483 |
|---|---|---|---|
| 4307088 | 4/1994 | Germany . | |

*Primary Examiner*—David M. Mitchell
*Assistant Examiner*—Kia M. Robinson
*Attorney, Agent, or Firm*—Evenson, McKeown, Edwards & Lenahan, P.L.L.C.

[57] ABSTRACT

A receiving arrangement for equipment and/or objects in the passenger compartment of a motor vehicle, has a shaft with inserts arranged therein above one another, such as a tray, a cassette box, an ashtray and the like. For a reliable holding of the inserts in the shaft, also in the case of a rear impact and while maintaining a simple mounting and demounting of the inserts, longitudinal guides are provided between each insert and the lateral shaft walls, for the drawer-type sliding-in and sliding-out of the inserts from the direction of the passenger compartment. A locking mechanism, which can be released only manually, is provided between each insert and the shaft and which engages automatically when the insert is slid in. The locking mechanisms are arranged in the shaft so that they are accessible for manual operation only after the removal of the insert disposed above from the shaft. Directly above the insert which is uppermost in the shaft, an access space reaches over the insert depth and is preferably occupied by a car radio or another fixedly mounted unit.

18 Claims, 2 Drawing Sheets

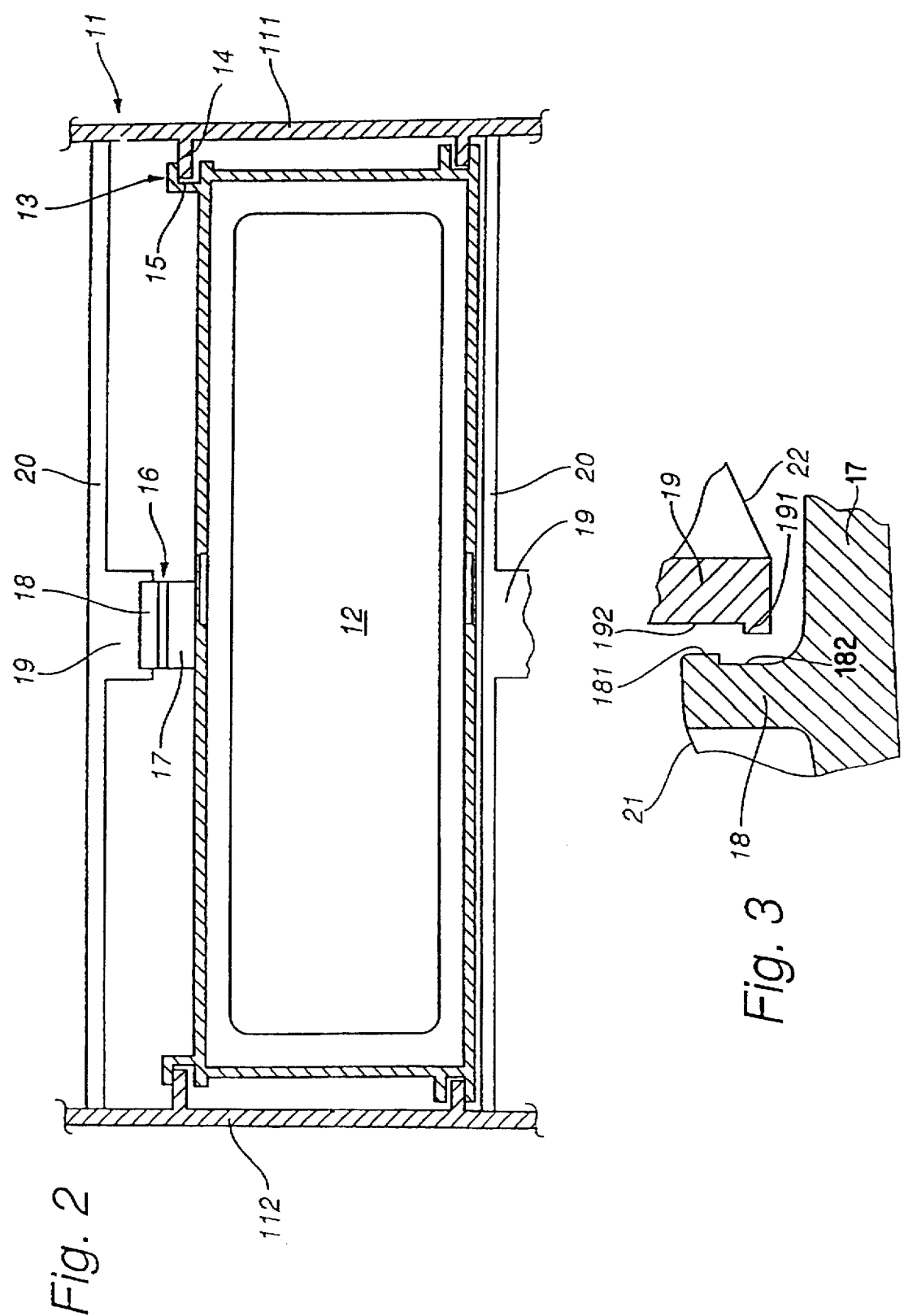

RECEIVING ARRANGEMENT FOR EQUIPMENT AND/OR OBJECTS IN A MOTOR VEHICLE PASSENGER COMPARTMENT

BACKGROUND AND SUMMARY OF THE INVENTION

The present invention relates to a receiving arrangement for equipment and/or objects in the passenger compartment of a motor vehicle, and more particularly, to an arrangement for things in a motor vehicle passenger compartment comprising a shaft fixed at the compartment and having a shaft opening pointing into the passenger compartment, and inserts arranged above one another in the shaft and having a charge opening pointing toward the passenger compartment.

In the known receiving arrangement shown as type DE 43 07 088 C1, the individual inserts are fastened in an exchangeable manner by plug-type connections with respect to one another. The constructional unit formed of the assembled inserts is inserted into the shaft through the shaft opening and, by way of a plug-on rib constructed on the uppermost insert, is slid onto a transverse web constructed in the shaft. A cover screen, which is constructed in the manner of a film hinge on the plug-on rib and which is screwed to the holder for the car radio arranged directly above the receiving arrangement, fixes the constructional unit with respect to an unintended pulling out of the shaft.

Such a known receiving arrangement can be mounted and demounted easily and rapidly and without any tool which has a favorable effect on the manufacturing and shop costs. However, it was found in practice that this type of fixing of the inserts in the shaft is not sufficient in order to reliably avoid having the inserts thrown out of the shaft during a rear crash, e.g. in the case of an impact of the vehicle on an obstacle with the rearward side first or when a second vehicle runs from behind onto the rear of the vehicle.

It is an object of the present invention to improve a receiving device for equipment and/or objects in the passenger compartment of a motor vehicle of the initially mentioned type such that, on one hand, the device can still be mounted and demounted in a rapid and simple manner and, on the other hand, meets the safety requirements in the case of a rear impact.

This object has been achieved according to the present invention by providing that between lateral shaft walls and each of the inserts, longitudinal guides are operatively arranged for a drawer-type sliding in action of the inserts into the shaft and a pulling out action of the inserts from the shaft, through the shaft opening; between each insert and the shaft, a manually releasable locking mechanism engages automatically during the sliding-in action of one of the inserts and is arranged such that, after the removal of the insert disposed thereabove from the shaft, the one insert is accessible for manual operation; and directly above another of the inserts uppermost in the shaft, an access space is arranged which extends over the insert depth.

The receiving arrangement according to the present invention has the advantage that the locking mechanism between each insert and the shaft, which engages automatically during the assembly, can be released again only manually and can therefore without any problems absorb high tensile forces, as they occur in the case of a rear impact. The particularly simple demounting is ensured after the removal of the insert situated above, in that, by virtue of the index finger, the force-locking and form-locking engagement can be released and the insert can then be pulled out. Thus, after the removal of the insert situated above, each insert can, in turn, be removed from the shaft rapidly and without any tools. The locking mechanism of the insert uppermost in the shaft is accessible by way of the access space arranged above it.

According to an advantageous currently contemplated embodiment of the present invention, the access space to the uppermost insert is utilized for housing the car radio or another fixedly mounted unit. Thus, no empty space is created, and the inserts can be demounted after the removal of the car radio in the above-described manner. Although a tool is required for the removal of the radio, nowadays the removal is generally service-friendly and can be carried out within seconds. Electric connections on the car radio do not have to be disconnected for the access to the locking mechanism of the uppermost insert of the receiving arrangement.

The high-strength locking mechanism according to the present invention between each insert and the shaft can be implemented in a constructively simple manner if, according to a currently preferred embodiment, each insert locking mechanism has a flexible tongue which extends on the top side of the insert at a parallel distance thereto and has a detent web which projects therefrom at a right angle, and a detent plate which is aligned in the shaft transversely to the shaft depth and behind which the detent web reaches when the slide-in end position of the insert in the shaft is reached.

For releasing the locking mechanism, the flexible tongue is moved downward on its free end to the surface off the insert, whereby the detent web lifts of the detent plate and by a pulling on the insert, can be moved past under the detent plate. Subsequently, the flexible tongue can be released again and the insert can be pulled completely out of the shaft. For automatically engaging the detent web and the detent plate at the end of the slide-in path, lifting slopes are constructed on both such that, during the sliding-in, the flexible tongue automatically moves downward and the detent web is guided past under the detent plate.

Other objects, advantages and novel features of the present invention will become apparent from the following detailed description of the invention when considered in conjunction with the accompanying drawings.

BRIEF DESCRIPTION OF THE DRAWINGS

FIG. 2 is a sectional view along Line II—II in FIG. 1;

FIG. 3 is an enlarged representation of the cutout III designated by dot-dash circle in FIG. 1.

DETAILED DESCRIPTION OF THE DRAWINGS

Figure 1:
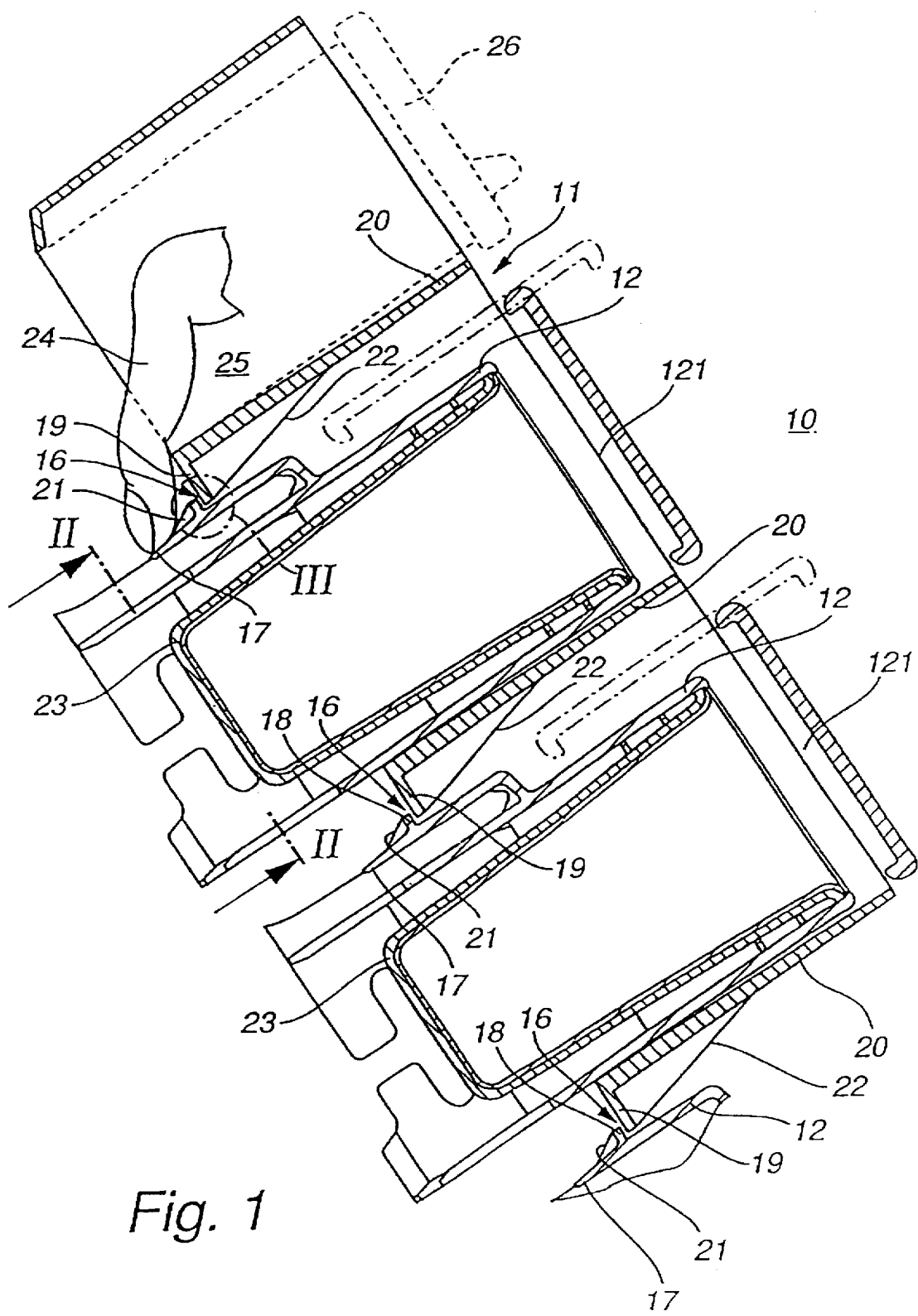
FIG. 1 is a longitudinal sectional view of a cutout of a receiving arrangement for equipment and/or objects in the passenger compartment of a motor vehicle in accordance with the present invention.

The receiving device for things such as equipment and/or objects in the passenger compartment of a motor vehicle, which is shown as a cutout of a longitudinal sectional view in FIG. 1, has a shaft designated generally by the numeral 11 and is fixed to the vehicle. The shaft 11 and has a shaft opening pointing to the passenger compartment 10 and formed in the vehicle, for example, by the so-called center console which extends in the center on the interior compartment front from the dashboard to the floor, and if a cardan tunnel exists, is disposed on the cardan tunnel. In this shaft 11, of which only a lateral wall is illustrated in FIG. 1, the inserts 12 are arranged above one another, in which case their charge openings 121 point to the passenger compartment 10, and thus to the seats, and are accessible to the vehicle occupants, that is, the driver and the front seat passenger. These inserts 12 can carry out different functions. For example, they may be constructed as a compartment for eyeglasses, a map compartment, a cassette box or an ash tray. In FIG. 1, two inserts 12 are illustrated but the number of inserts 12 may be larger depending on the height of the shaft 11.

Between the two mutually opposite lateral shaft walls 111, 112 as seen now in FIG. 2 and each insert 12, longitudinal guides 13 are provided for the drawer-type sliding-in of the inserts 12 into the shaft 11 and the pulling of the inserts 12 out of the shaft 11, in each case, through the shaft opening. Each longitudinal guide 13 is formed by a rib 14 which projects at a right angle on the inside on the lateral shaft wall 111 or 112 and which extends in the shaft depth, and by a rail-type recess 15 which is constructed on the insert 12 and has a U-profile, into which recess 15 the rib 14 engages with play. Overall, four longitudinal guides 13 are provided between each insert 12 and the shaft 11 so that the insert 12 has on its corner edges a total of four recesses 15 which are molded-on in one piece, extending in the longitudinal direction of the insert 12, and each lateral wall 111 and 112 carries two ribs 14.

Between each insert 12 and the shaft 11, a locking mechanism 16 is provided which, when the insert 12 is slid in, engages automatically when the slide-in end position of the insert 12 is reached. The locking mechanism 16 is constructed such that it can be released only manually. For this purpose, the locking mechanism 16 has a flexible tongue 17 which extends on the top side of the insert 12 at a parallel distance thereto and has a detent web 18 which projects therefrom at a right angle, and a detent plate 19 which is fixed in the shaft 11 and is aligned transversely to the shaft depth. As illustrated in FIG. 1 and 2, the detent plate 19 is constructed in one piece on an intermediate shaft wall 20 which is held between the two shaft walls 111 and 112 (FIG. 2) and extends only along a portion of the shaft depth (FIG. 1). The detent plate 19 is constructed in one piece in the center on the intermediate wall 20 and projects away therefrom at a right angle in the downward direction.

In the enlarged representation of cutout III illustrated in FIG. 3, a detent 181 is formed on the detent web 18 and a detent 191 is formed on the detent plate 19. Here, the detents 181, 191 project from the mutually facing areas 182, 192 of the respective detent web 18 and of the detent plate 19, and are offset with respect to one another in the vertical direction. Between the end of the flexible tongue 17 and the detent web 18, a lifting slope 21 extends on the top side of the flexible tongue 17 and rises from the flexible tongue end to the free end of the detent web 18. Another lifting slope 22 extends on the intermediate wall 20 and rises to the free end of the detent plate 19.

For mounting the receiving arrangement, each insert 12 is slid in the longitudinal guides 13 into the shaft 11. The lifting slope 21 constructed on the flexible tongue 17 slides along the lifting slope 22 constructed on the intermediate shaft wall 20. Consequently, the flexible tongue 17 is pressed downward with its free end so that the detent web 18 can move through under the detent plate 19. In the slide-in end position, the insert 12 strikes against a stop 23 (FIG. 1) in the shaft 11. In this slide-in end position, the detent web 18 has passed the detent plate 19, and under the spring effect of the flexible tongue 17, the detent web 18 snaps behind the detent plate 19. A pulling-out of the insert 12 will now no longer be possible. Even in the case of a rear impact, the forces applied to the insert 12 will not be sufficient for releasing the locking mechanism 16. In the case of extreme tensile forces on the insert 12, the detents 181, 191 hook into the detent web 18 and the detent plate 19 and prevent the detent web 18 from sliding off the detent plate 19.

As illustrated in FIG. 1, for demounting an insert 12, there must be a reaching over the intermediate shaft wall 20, and the flexible tongue 17 situated behind the end of the intermediate wall 20 must be pressed by the index finger 24 so far downward, that is, in the direction of the insert 12, until the detent web 18 lifts off the detent plate 19. By a slight pulling on the insert 12, the detent web 18 can be moved past under the detent plate 19. Subsequently, the lifting slopes 21, 22 will again rest on one another; the flexible tongue 17 can be let go; and the insert 12 can be pulled completely out of the shaft 11. When the insert 12 has been pulled out of the shaft 11, the locking mechanism 16 of the insert 12 situated underneath now becomes accessible through the space freed by the removed insert 12 in the shaft 11, and the insert 12 situated underneath can be demounted in the same manner. The inserts 12 may therefore be removed in the sequence of from the uppermost to the lowermost insert 12 in the shaft 11 after the releasing of the respective locking mechanism 16.

So that the uppermost insert in the shaft 11 can also be demounted, an access space 25 is provided above the uppermost insert 12, through which access space 25 the locking mechanism 16 of the insert 12 which is uppermost in the shaft 11 can be gripped by means of the index finger 24. As illustrated in FIG. 1, this access space 25 is utilized for housing a car radio 26 which is outlined in FIG. 1 by a dot-dash line. In a conventional manner, this car radio 26 is fixedly mounted in the access space 25 so that the demounting of the receiving arrangement requires the previous demounting of the car radio 26 and the exposure of the access space 25. With today's holder constructions for car radios 26, the demounting of the car radio 26 can be carried out within seconds. Thus, the required removal of the car radio 26 will not impair the demounting of he arrangement in an inappropriate manner. The disconnecting of he electric connections on the car radio 26 is not required for the access to the locking mechanism 16 on the uppermost insert 12 through the access space 25.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A receiving arrangement for things in a motor vehicle passenger compartment having a shaft fixed at the compartment and having a shaft opening pointing into the passenger compartment and lateral shaft walls, and inserts arranged above one another in the shaft opening and having a charge opening pointing toward the passenger compartment, comprising longitudinal guides of the lateral shaft walls; said inserts operatively arranged for a drawer-type sliding-in action into the shaft opening and a pulling out action from the shaft opening; a manually releasable locking mechanism located between each of said inserts and engaging automatically during the sliding-in action of one of the inserts in an insertion direction and preventing sliding-out-movement of said inserts in a direction opposite to said insertion direction, and arranged such that, after the removal of a first of the inserts being disposed above a second of said inserts out of the shaft, the second insert being accessible for manual operation; and an access space which is arranged in the shaft directly above the uppermost insert in the shaft, said access space extending over a depth of said insert and allowing manual release of said locking mechanism of said uppermost insert.

2. The arrangement according to claim 1, wherein the access space is occupied by one of a car radio and another fixedly mounted unit.

3. The arrangement according to claim 1, wherein each insert locking mechanism has a flexible tongue extending on a top side of the insert parallel thereto and having a detent web projecting at a right angle therefrom, and a detent plate is aligned in the shaft transversely to a depth of the shaft, the detent web reaching behind the detent plate when the slide-in end position of the insert in the shaft is reached.

4. The arrangement according to claim 3, wherein the access space is occupied by one of a car radio and another fixedly mounted unit.

5. The arrangement according to claim 3, wherein each detent plate is constructed in one piece on an intermediate wall which is held between the lateral shaft walls and extends parallel to the insert along a portion of the shaft depth.

6. The arrangement according to claim 3, wherein on the detent web and on the detent plate, lifting slopes are arranged to slide along one another when the insert is slid in.

7. The arrangement according to claim 6, wherein each detent plate is constructed in one piece on an intermediate wall which is held between the lateral shaft walls and extends parallel to the insert along a portion of the shaft depth.

8. The arrangement according to claim 3, wherein on the mutually facing surfaces of the detent web and of the detent plate, detents project therefrom and are vertically offset with respect to one another.

9. The arrangement according to claim 8, wherein each detent plate is constructed in one piece on an intermediate wall which is held between the lateral shaft walls and extends parallel to the insert along a portion of the shaft depth.

10. The arrangement according to claim 9, wherein on the detent web and on the detent plate, lifting slopes are arranged to slide along one another when the insert is slid in.

11. The arrangement according to claim 1, wherein the longitudinal guides are ribs projecting on the lateral shaft walls and extending in a shaft depth and rail-type recesses on the inserts configured and arranged to engage the ribs with play.

12. The arrangement according to claim 11, wherein the access space is occupied by one of a car radio and another fixedly mounted unit.

13. The arrangement according to claim 11, wherein each insert locking mechanism has a flexible tongue extending on a top side of the insert parallel thereto and having a detent web projecting at a right angle therefrom, and a detent plate is aligned in the shaft transversely to a depth of the shaft, the detent web reaching behind the detent plate when the slide-in end position of the insert in the shaft is reached.

14. The arrangement according to claim 13, wherein the access space is occupied by one of a car radio and another fixedly mounted unit.

15. The arrangement according to claim 13, wherein each detent plate is constructed in one piece on an intermediate wall which is held between the lateral shaft walls and extends parallel to the insert along a portion of the shaft depth.

16. The arrangement according to claim 13, wherein on the detent web and on the detent plate, lifting slopes are arranged to slide along one another when the insert is slid in.

17. The arrangement according to claim 14, wherein each detent plate is constructed in one piece on an intermediate wall which is held between the lateral shaft walls and extends parallel to the insert along a portion of the shaft depth.

18. The arrangement according to claim 13, wherein on the mutually facing surfaces of the detent web and of the detent plate, detents project therefrom and are vertically offset with respect to one another.

* * * * *